United States Patent
Kang et al.

(10) Patent No.: US 8,836,898 B2
(45) Date of Patent: Sep. 16, 2014

(54) COMPENSATION SYSTEM FOR LIQUID CRYSTAL PANELS AND LIQUID CRYSTAL DISPLAY

(71) Applicant: Shenzhen China Star Optoelectronics Technology Co., Ltd., Guangdong (CN)

(72) Inventors: Chih-tsung Kang, Shenzhen (CN); Bo Hai, Shenzhen (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 153 days.

(21) Appl. No.: 13/700,701

(22) PCT Filed: Nov. 8, 2012

(86) PCT No.: PCT/CN2012/084317
§ 371 (c)(1),
(2), (4) Date: Nov. 28, 2012

(87) PCT Pub. No.: WO2014/071594
PCT Pub. Date: May 15, 2014

(65) Prior Publication Data
US 2014/0125923 A1 May 8, 2014

(30) Foreign Application Priority Data
Nov. 6, 2012 (CN) .......................... 2012 1 0438344

(51) Int. Cl.
*G02F 1/13363* (2006.01)
*G02F 1/1335* (2006.01)

(52) U.S. Cl.
CPC .... *G02F 1/133634* (2013.01); *G02F 1/133528* (2013.01)
USPC ............ 349/119; 349/102; 349/118; 349/122

(58) Field of Classification Search
CPC .................. G02F 1/133634; G02F 1/133528;
G02F 2001/133531; G02F 2001/133746;
G02F 2413/02; G02F 2413/11; G02F 2413/12;
G02B 5/32; G02B 5/3083
USPC ................... 349/96, 102, 118, 119, 122, 130;
359/489.07; 428/1.3
See application file for complete search history.

(56) References Cited

U.S. PATENT DOCUMENTS

| | | | |
|---|---|---|---|
| 2008/0174724 A1* | 7/2008 | Nakayama et al. | 349/96 |
| 2009/0207355 A1* | 8/2009 | Yanai et al. | 349/119 |
| 2010/0271573 A1* | 10/2010 | Sakai | 349/96 |
| 2011/0051062 A1* | 3/2011 | Sakai | 349/120 |
| 2011/0128482 A1* | 6/2011 | Ishiguro | 349/106 |
| 2012/0236235 A1* | 9/2012 | Ishiguro | 349/96 |

* cited by examiner

*Primary Examiner* — Dung Nguyen
*Assistant Examiner* — Tai Duong
(74) *Attorney, Agent, or Firm* — Andrew C. Cheng (57) ABSTRACT

A compensation system for liquid crystal panels and a liquid crystal display are disclosed. The compensation system includes a first biaxial compensation film and a second biaxial compensation film respectively arranged on two sides of the liquid crystal panel. When the wavelength of incident lights is 550 nm, an in-plain retardation value of the first biaxial compensation film is Ro1, a thickness retardation value of the first biaxial compensation film is Rth1, an in-plain retardation value of the second biaxial compensation film is Ro2, and a thickness retardation value of the second biaxial compensation film is Rth2. Wherein 35 nm ≤ Ro1 ≤ 87.5 nm; 80 nm ≤ Rth1 ≤ 200 nm; 28 nm ≤ Ro2 ≤ 89.6 nm; Y1 ≤ Rth2 ≤ Y2; Y1=0.005389×Rth1$^2$−2.367048×Rth1+323.45; Y2=−0.003571×Rth1$^2$+0.085714×Rth1+226.74. By configuring the retardation values of the double-layers biaxial compensation films, the dark-state light leakage of the liquid crystal panels may be reduced.

14 Claims, 8 Drawing Sheets

COMPENSATION SYSTEM FOR LIQUID CRYSTAL PANELS AND LIQUID CRYSTAL DISPLAY

BACKGROUND OF THE INVENTION

1. Field of the Invention

Embodiments of the present disclosure relate to liquid crystal display technology, and more particularly to a compensation system for liquid crystal panels and a liquid crystal display.

2. Discussion of the Related Art

Liquid crystal devices have been the most popular display devices nowadays. However, as the viewing angle is increased, the contrastness and the resolution are become worse. This is because the birefringence of liquid crystals changes in accordance with the viewing angles. By adopting a wide-viewing angle compensation film, the light leakage in a dark state may be reduced and the contrastness may be greatly enhanced within a certain viewing angle. Most of the compensation films, including single-layer or double layers biaxial compensation films, are for the vertical alignment-mode liquid crystal displays. In order to minimum the light leakage in the dark state, different retardation values are adopted when optical path difference ($\Delta n \times d$) are different. If an improper retardation value is adopted, not only the dark-state light leakage may become more serious at the wide viewing angle, but also the contrastness and the resolution of the liquid crystal display are affected.

Figure 1:
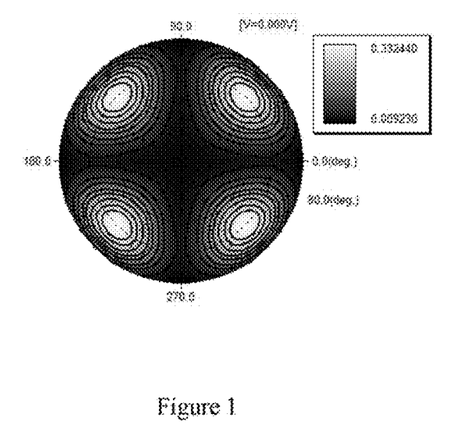
FIG. 1 is a distribution diagram showing the dark-state light leakage of the conventional double-layers biaxial compensation structure.
Figure 2:
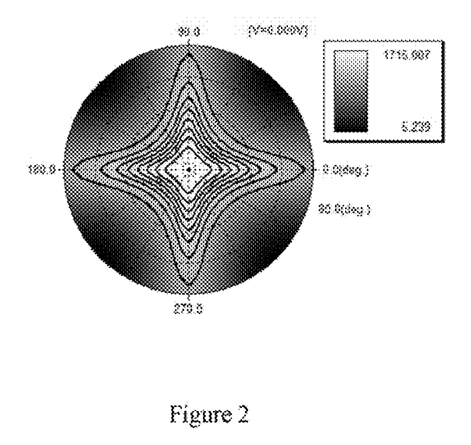
FIG. 2 is a simulation diagram of the contrastness distribution for the conventional double-layers biaxial compensation structure in a wide viewing angle.

FIG. 1 is a distribution diagram showing the dark-state light leakage of the conventional double-layers biaxial compensation structure. FIG. 2 is a simulation diagram of the contrastness distribution for the conventional double-layers biaxial compensation structure in a wide viewing angle. Wherein the optical path difference ($\Delta n \times d$) is 352.1 nm, the in-plain retardation value (Ro) of the double-layers biaxial compensation is 70 nm, and the thickness retardation value (Rth) is 160 nm. It can be seen from FIGS. 1 and 2 that the light leakage still exists in the areas with azimuthal angles of (30-60) degrees, (120-150) degrees, (210-240) degrees, and (300-330) degrees as the contrastness for the above viewing angles is low.

Therefore, there is a need to provide a compensation system for the liquid crystal panels and a liquid crystal display to overcome the above problems.

SUMMARY

The object of the claimed invention is to provide a compensation system for liquid crystal panels and a liquid crystal display to greatly reduce the dark-state light leakage.

By configuring the retardation values of the double-layers biaxial compensation film, the dark-state light leakage of the liquid crystal panels may be reduced. In addition, the contrastness and the resolution are also increased in the wide viewing angle.

In one aspect, a liquid crystal display includes:

a liquid crystal panel includes a liquid crystal layer, the liquid crystal layer includes a plurality of liquid crystals, when a wavelength of incident lights is 550 nm, a refractive index anisotropy of the incident lights is $\Delta n$, a thickness of the liquid crystal layer is d, and a pretilt angle of the liquid crystals is $\theta$;

a first polarizing film and a second polarizing film arranged on two sides of the liquid crystal panel;

a first biaxial compensation film and a second biaxial compensation film respectively arranged on two sides of the liquid crystal panel, the first biaxial compensation film is arranged between the first polarizing film and the liquid crystal panel, the second biaxial compensation film is arranged between the second polarizing film and the liquid crystal panel, when the wavelength of the incident lights is 550 nm, an in-plain retardation value of the first biaxial compensation film is Ro1, a thickness retardation value of the first biaxial compensation film is Rth1, an in-plain retardation value of the second biaxial compensation film is Ro2, and a thickness retardation value of the second biaxial compensation film is Rth2, wherein:

$$342.8 \text{ nm} \leq \Delta n \times d \leq 361.4 \text{ nm};$$

$$85° \leq \theta < 90°;$$

$$35 \text{ nm} \leq Ro1 \leq 87.5 \text{ nm};$$

$$80 \text{ nm} \leq Rth1 \leq 200 \text{ nm};$$

$$28 \text{ nm} \leq Ro2 \leq 89.6 \text{ nm};$$

$$Y1 \leq Rth2 \leq Y2;$$

$$Y1 = 0.005389 \times Rth1^2 - 2.367048 \times Rth1 + 323.45;$$

$$Y2 = -0.003571 \times Rth1^2 + 0.085714 \times Rth1 + 226.74;$$

the first polarizing film is arranged on the same side with the first biaxial compensation film, an absorbing axis of the first polarizing film and a slow axis of the first biaxial compensation film form an angle of 90 degrees, the second polarizing film is arranged on the same side with the second biaxial compensation film, and the absorbing axis of the second polarizing film and the slow axis of the second biaxial compensation film form an angle of 90 degrees, and wherein the first polarizing film and the second polarizing film are polyvinyl alcohol (PVA) film.

Wherein:

$$118.2 \text{ nm} \leq Rth1 = Rth2 \leq 154.2 \text{ nm}.$$

Wherein the liquid crystal display further comprises a first pressure sensitive adhesive layer and a second pressure sensitive adhesive layer, the first pressure sensitive adhesive layer is arranged between the first biaxial compensation film and the liquid crystal panel, and the second pressure sensitive adhesive layer is arranged between the second biaxial compensation film and the liquid crystal panel.

Wherein the liquid crystal display further comprises a first Triacetyl Cellulose (TAC) film and a second TAC film, the first TAC film is arranged on a first surface of the first polarizing film, the first surface faces away from the first biaxial compensation film, the second TAC film is arranged on a second surface of the second polarizing film, and the second surface faces away from the second biaxial compensation film.

In another aspect, a compensation system for liquid crystal panels includes:

a first biaxial compensation film and a second biaxial compensation film respectively arranged on two sides of the liquid crystal panel, when a wavelength of incident lights is 550 nm, an in-plain retardation value of the first biaxial compensation film is Ro1, a thickness retardation value of the first biaxial compensation film is Rth1, an in-plain retardation value of the second biaxial compensation film is Ro2, and a thickness retardation value of the second biaxial compensation film is Rth2, wherein:

$$35 \text{ nm} \leq Ro1 \leq 87.5 \text{ nm};$$

$$80 \text{ nm} \leq Rth1 \leq 200 \text{ nm};$$

$28 \text{ nm} \leq Ro2 \leq 89.6 \text{ nm};$ $Y1 \leq Rth2 \leq Y2;$ $Y1 = 0.005389 \times Rth1^2 - 2.367048 \times Rth1 + 323.45;$ $Y2 = -0.003571 \times Rth1^2 + 0.085714 \times Rth1 + 226.74.$ Wherein:

$118.2 \text{ nm} \leq Rth1 = Rth2 \leq 154.2 \text{ nm}.$

Wherein an optical path difference ($\Delta n \times d$) is in a range between 342.8 nm and 361.4 nm.

In another aspect, a liquid crystal display includes:

a liquid crystal panel includes a liquid crystal layer, the liquid crystal layer includes a plurality of liquid crystals, when a wavelength of incident lights is 550 nm, a refractive index anisotropy of incident lights is $\Delta n$, a thickness of the liquid crystal layer is d, and a pretilt angle of the liquid crystals is $\theta$;

a first biaxial compensation film and a second biaxial compensation film respectively arranged on two sides of the liquid crystal panel, when the wavelength of the incident lights is 550 nm, an in-plain retardation value of the first biaxial compensation film is Ro1, a thickness retardation value of the first biaxial compensation film is Rth1, an in-plain retardation value of the second biaxial compensation film is Ro2, and a thickness retardation value of the second biaxial compensation film is Rth2, wherein:

$342.8 \text{ nm} \leq \Delta n \times d \leq 361.4 \text{ nm};$ $85° \leq \theta < 90°;$ $35 \text{ nm} \leq Ro1 \leq 87.5 \text{ nm};$ $80 \text{ nm} \leq Rth1 \leq 200 \text{ nm};$ $28 \text{ nm} \leq Ro2 \leq 89.6 \text{ nm},$ $Y1 \leq Rth2 \leq Y2;$ $Y1 = 0.005389 \times Rth1^2 - 2.367048 \times Rth1 + 323.45;$ $Y2 = -0.003571 \times Rth1^2 + 0.085714 \times Rth1 + 226.74.$ Wherein:

$118.2 \text{ nm} \leq Rth1 = Rth2 \leq 154.2 \text{ nm}.$

Wherein the liquid crystal display further comprises a first polarizing film and a second polarizing film arranged on two sides of the liquid crystal panel, the first polarizing film is arranged on the same side with the first biaxial compensation film, an absorbing axis of the first polarizing film and a slow axis of the first biaxial compensation film form an angle of 90 degrees, the second polarizing film is arranged on the same side with the second biaxial compensation film, and the absorbing axis of the second polarizing film and the slow axis of the second biaxial compensation film form an angle of 90 degrees.

Wherein the first polarizing film and the second polarizing film are PVA films.

Wherein the first biaxial compensation film is arranged between the first polarizing film and the liquid crystal panel, and the second biaxial compensation film is arranged between the second polarizing film and the liquid crystal panel.

Wherein the liquid crystal display further comprises a first pressure sensitive adhesive layer and a second pressure sensitive adhesive layer, the first pressure sensitive adhesive layer is arranged between the first biaxial compensation film and the liquid crystal panel, and the second pressure sensitive adhesive layer is arranged between the second biaxial compensation film and the liquid crystal panel.

Wherein the liquid crystal display further comprises a first TAC film and a second TAC film, the first TAC film is arranged on a first surface of the first polarizing film, the first surface faces away from the first biaxial compensation film, the second TAC film is arranged on a second surface of the second polarizing film, and the second surface faces away from the second biaxial compensation film.

DETAILED DESCRIPTION OF THE EMBODIMENTS

Embodiments of the invention will now be described more fully hereinafter with reference to the accompanying drawings, in which embodiments of the invention are shown.

Figure 3:
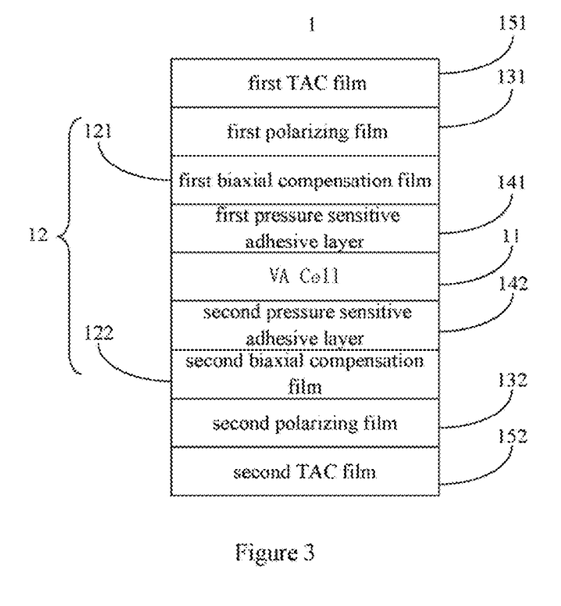
FIG. 3 is a schematic view of the liquid crystal display in accordance with a first embodiment.

FIG. 3 is a schematic view of the liquid crystal display in accordance with a first embodiment. The liquid crystal display 1 includes a liquid crystal panel 11, a compensation system 12, a first polarizing film 131, a second polarizing film 132, a first pressure sensitive adhesive layer 141, a second pressure sensitive adhesive layer 142, a first Triacetyl Cellulose (TAC) film 151 and a second TAC film 152.

Figure 4:
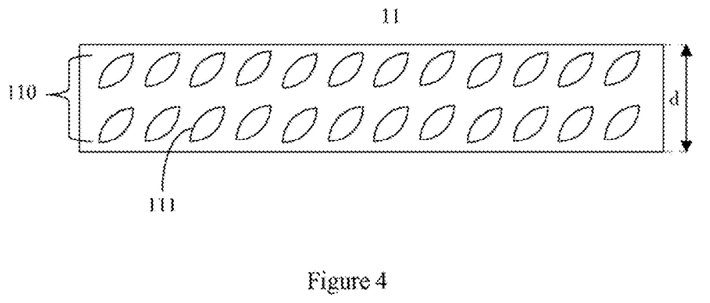
FIG. 4 is a schematic view of the liquid crystal panel in accordance with the first embodiment.

In the embodiment, the liquid crystal panel 11 includes vertical alignment (VA) cells. FIG. 4 is a schematic, view of the liquid crystal panel 11 in accordance with the first embodiment. The liquid crystal panel 11 includes a liquid crystal layer 110 having a plurality of liquid crystals 111. When a wavelength of the incident lights is 550 nm, a refractive index anisotropy of incident lights is Δn. A thickness of the liquid crystal layer 110 is d, an optical path difference is Δn×d, and a pretilt angle of the liquid crystals 111 is θ. Wherein 342.8 nm≤Δn×d≤361.4 nm, and 85°≤θ<90.

Figure 5:
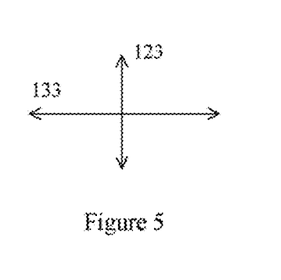
FIG. 5 is a schematic view of a slow axis of the first biaxial compensation film and an absorbing axis of the first polarizing film in accordance with the first embodiment.
Figure 6:
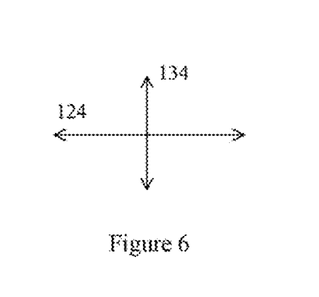
FIG. 6 is a schematic view of a slow axis of the second biaxial compensation film and an absorbing axis of the second polarizing film in accordance with the first embodiment.

The compensation system 12 includes a first biaxial compensation film 121 and a second biaxial compensation film 122 respectively arranged on two sides of the liquid crystal panel 11. The first polarizing, film 131 is arranged on the same side with the first biaxial compensation film 121. FIG. 5 is a schematic view of a slow axis of the first biaxial compensation film and an absorbing axis of the first polarizing film. The absorbing axis 133 of the first polarizing film 131 and the slow axis 123 of the first biaxial compensation film 121 form an angle of 90 degrees. The second polarizing film 132 is arranged on the same side with the second biaxial compensation film. FIG. 6 is a schematic view of the slow axis of the second biaxial compensation film and the absorbing axis of the second polarizing film.

The absorbing axis 134 of the second polarizing film 132 and the slow axis 124 of the second biaxial compensation film form an angle of 90 degrees. Preferably, the first polarizing film 131 and the second polarizing, film 132 are PVA (polyvinyl alcohol) film.

As shown in FIG. 3, the first biaxial compensation film 121 is arranged between the first polarizing film 131 and the liquid crystal panel 11, and the second biaxial compensation film 122 is arranged between the second polarizing film 132 and the liquid crystal panel 11. The first pressure sensitive adhesive layer 141 is arranged between the first biaxial compensation film 121 and the liquid crystal panel 11, and the second pressure sensitive adhesive layer 142 is arranged between the second biaxial compensation film 122 and the liquid crystal panel 11. The pressure sensitive adhesive layers 141, 142 are for connecting the biaxial compensation films 121, 122 and the liquid crystal panel 11. By applying a slight force to the pressure sensitive adhesive layers 141, 142, the above-mentioned structure may be fixed quickly. The pressure sensitive adhesive layers may quickly wet the films as fluids, and may be removed from the films as solids. The first TAC film 151 is arranged on a first surface of the first polarizing film 131, and the first surface faces away from the first biaxial compensation film 121. The second TAC film 152 is arranged on a second surface of the second polarizing film 132, and the second surface faces away from the second biaxial compensation film 122. The TAC films 151, 152 keep shapes and moisture of the polarizing films 131, 132 unchanged. The TAC films have attributes including high water-resistance, low thermal shrinkage, and high endurance so that the TAC films may work in a high-temperature condition.

When the wavelength of the incident lights is 550 nm, an in-plain retardation value of the first biaxial compensation film 121 is Ro1, and a thickness retardation value of the first biaxial compensation film 121 is Rth1 in addition, an in-plain retardation value of the second biaxial compensation film 122 is Ro2, and a thickness retardation value of the second biaxial compensation film 122 is Rth2.

Figure 7:
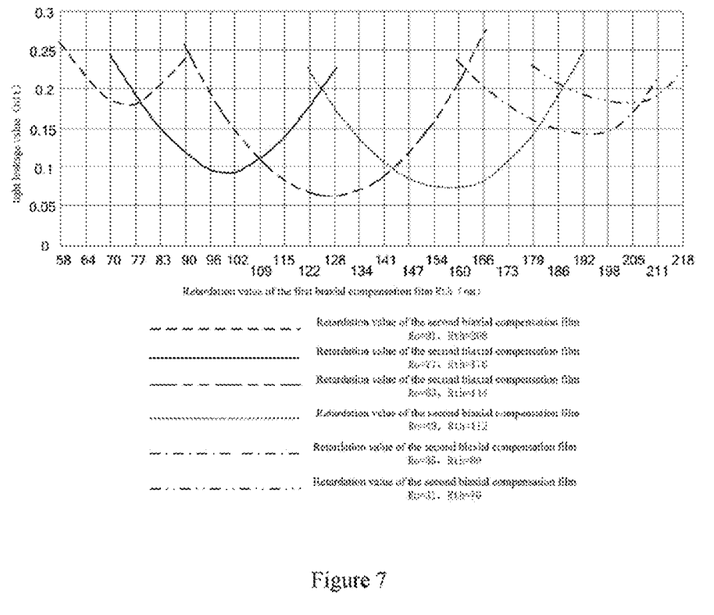
FIG. 7 is a trend chart illustrating the dark-state light leakage changes in accordance with the retardation values when the optical path difference ($\Delta n \times d$) is 342.8 nm.
Figure 8:
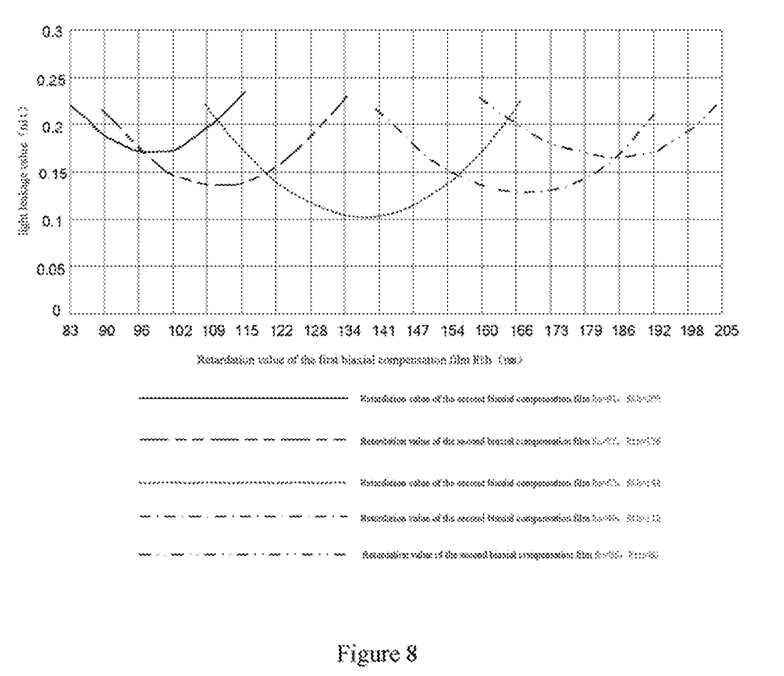
FIG. 8 is a trend chart illustrating the dark-state light leakage changes in accordance with the retardation values when the optical path difference ($\Delta n \times d$) is 361.4 nm.

FIG. 7 is a trend chart illustrating the dark-state light leakage changes in accordance with the retardation values when the optical path difference (Δn×d) is 342.8 nm. FIG. 8 is a trend chart illustrating the dark-state light leakage changes in accordance with the retardation values when the optical path difference (Δn×d) is 361.4 nm. It can be seen from FIGS. 7 and 8 that the trend of the retardation values of the first biaxial compensation film 121 and the second biaxial compensation film 122 are similar when the pretilt angles θ are different. That is, the range of the retardation values corresponding to a minimum dark-state light leakage is the same.

Basing on FIGS. 7 and 8, the retardation values for different pretilt angles are simulated when the optical path difference (Δn×d) is in a range between 342.8 nm and 361.4 nm, and the pretilt angle θ is in the range between 85 degrees and 90 degrees. When the dark-state light leakage is less than 0.2 nit, the ranges of the corresponding retardation values of the first biaxial compensation film 121 and the second biaxial compensation film 122 satisfy the equations:

$$35\ nm \leq Ro1 \leq 87.5\ nm$$

$$80\ nm \leq Rth1 \leq 200\ nm$$

$$28\ nm \leq Ro2 \leq 89.6\ nm$$

$$Y1 \leq Rth2 \leq Y2$$

wherein:

$$Y1 = 0.005389 \times Rth1^2 - 2.367048 \times Rth1 + 323.45$$

$$Y2 = -0.003571 \times Rth1^2 + 0.085714 \times Rth1 + 226.74$$

Therefore, the in-plain retardation values Ro1, Ro2 and the thickness retardation values Rth1, Rth2 of the biaxial compensation films 121, 122 are configured for the incident lights with wavelength equal to 550 nm. The best compensation result and the minimum dark-state light leakage may be obtained by configuring the retardation values to be in the above ranges.

In the manufacturing process, the in-plain retardation values Ro1, Ro2 and the thickness retardation values Rth1, Rth2 of the first biaxial compensation film 121 and the second biaxial compensation film 122 are substantially the same. In this way, the manufacturing process is efficient as only one process is needed. In the second embodiment, the in-plain retardation values Ro1, Ro2 and the thickness retardation values Rth1, Rth2 of the biaxial compensation films 121, 122 are also substantially the same.

Figure 9:
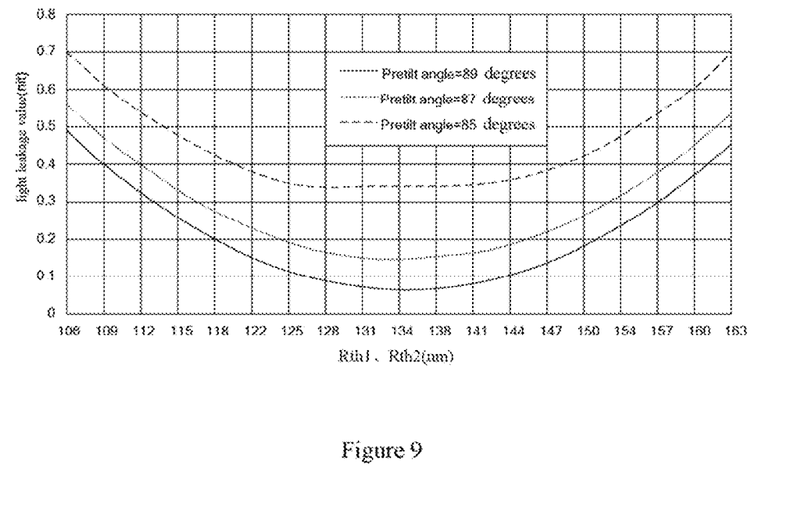
FIG. 9 is a trend chart illustrating the dark-state light leakage changes in accordance with the retardation values when the optical path difference ($\Delta n \times d$) is 342.8 nm of the second embodiment.

FIG. 9 is a trend chart illustrating the dark-state light leakage changes in accordance with the retardation values when the optical path difference (Δn×d) is 342.8 nm of the second embodiment.

Figure 10:
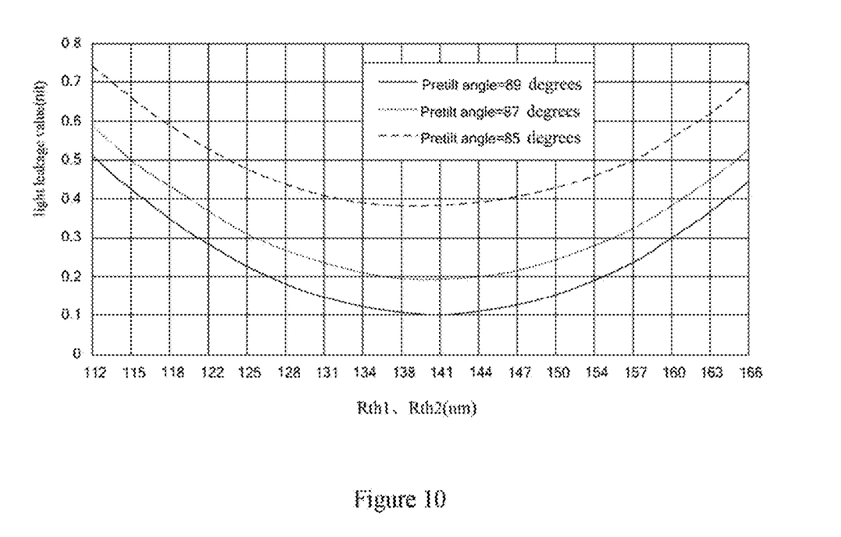
FIG. 10 is a trend chart illustrating the dark-state light leakage changes in accordance with the retardation values when the optical path difference ($\Delta n \times d$) is 361.4 nm of the second embodiment.

FIG. 10 is a trend chart illustrating the dark-state light leakage changes in accordance with the retardation values when the optical path difference (Δn×d) is 361.4 nm of the second embodiment.

Basing on FIGS. 9 and 10, the retardation values and the pretilt angles are simulated when the optical path difference (Δn×d) is in a range between 342.8 nm and 361.4 nm, and the pretilt angle θ is in the range between 85 degrees and 90 degrees. When the in-plain retardation values Ro1, Ro2 and the thickness retardation values Rth1, Rth2 are substantially the same, a reasonable range of the retardation values are:

$$118.2\ nm \leq Rth1 = Rth2 \leq 154.2\ nm$$

Figure 11:
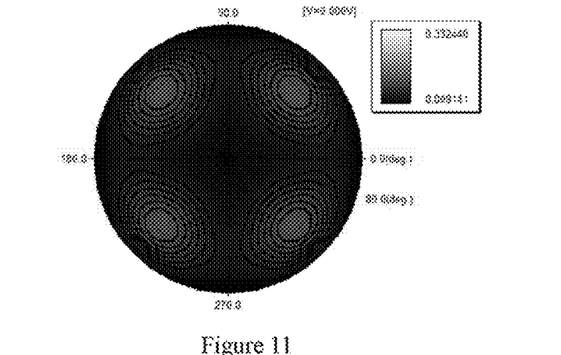
FIG. 11 is a distribution diagram showing the dark-state light leakage of the compensation system in accordance with one embodiment.
Figure 12:
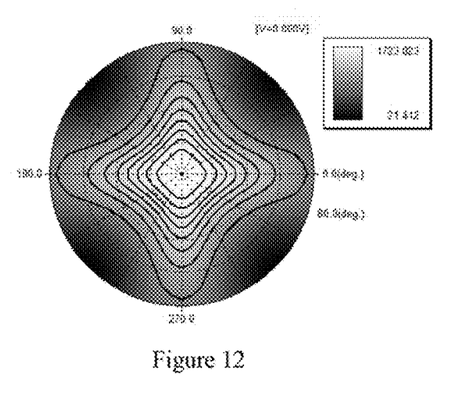
FIG. 12 is a distribution diagram showing the contrastness of the compensation system in accordance with one embodiment in a wide viewing angle.

FIG. 11 is a distribution diagram showing the dark-state light leakage of the compensation system. FIG. 12 is a distribution diagram showing the contrastness of the compensation system in the wide viewing angle. The optical path difference (Δn×d) is 352.1 nm, and the pretilt angle θ is 89 degrees. The in-plain retardation values Ro1, Ro2 of the first biaxial compensation film 121 and the second biaxial compensation film 122 equal to 63 nm. The thickness retardation values Rth1, Rth2 of the second biaxial compensation film 122 equal to 144 nm.

Comparing FIG. 11 to FIG. 1, it can be seen that the dark-state light leakage of the compensation system is lower than that of the typical double-layers biaxial compensation film. Comparing FIG. 12 to FIG. 2, it can be seen that the contrastness distribution of the compensation system is better than that of the typical double-layers biaxial compensation film in the wide viewing angle.

Specifically the in-plain retardation value Ro, the thickness retardation value Rth, the reflective rate N, and the thickness d of the biaxial compensation film satisfy the equations:

$$Ro=(Nx-Ny)*d$$

$$Rth=[(Nx+Ny)/2-Nz]*d$$

The in-plain retardation value and the thickness retardation value of the biaxial compensation film may be configured in accordance with the above equations. For example, the retardation values may be changed by adjusting the thickness d when the reflective rate N is fixed. Alternatively, the retardation values may be changed by adjusting the reflective rate N when the thickness d is fixed. It is understood that the retardation values may be changed by adjusting the reflective rate N and the thickness d at the same time.

In one embodiment, the compensation system is for the above liquid crystal panels.

It is to be understood that the structure of the compensation system of the first embodiment may be adjusted. In other embodiments, the locations of the first biaxial compensation film 121 and the second biaxial compensation film 122 may be switched.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A compensation system for liquid crystal panels, comprising:
a first biaxial compensation film and a second biaxial compensation film respectively arranged on two sides of the liquid crystal panel, when a wavelength of incident lights is 550 nm, an in-plain retardation value of the first biaxial compensation film is Ro1, a thickness retardation value of the first biaxial compensation film is Rth1, an in-plain retardation value of the second biaxial compensation film is Ro2, and a thickness retardation value of the second biaxial compensation film is Rth2, wherein:

$$35 \text{ nm} \leq Ro1 \leq 87.5 \text{ nm};$$

$$80 \text{ nm} \leq Rth1 \leq 200 \text{ nm};$$

$$28 \text{ nm} \leq Ro2 \leq 89.6 \text{ nm};$$

$$Y1 \leq Rth2 \leq Y2;$$

$$Y1=0.005389 \times Rth1^2-2.367048 \times Rth1+323.45;$$

$$Y2=-0.003571 \times Rth1^2+0.085714 \times Rth1+226.74.$$

2. The compensation system as claimed in claim 1, wherein:

$$118.2 \text{ nm} \leq Rth1=Rth2 \leq 154.2 \text{ nm}.$$

3. The compensation system as claimed in claim 1, wherein an optical path difference ($\Delta n \times d$) is in a range between 342.8 nm and 361.4 nm.

4. A liquid crystal display, comprising:
a liquid crystal panel comprising a liquid crystal layer, the liquid crystal layer comprising a plurality of liquid crystals, when a wavelength of incident lights is 550 nm, a refractive index anisotropy of incident lights is $\Delta n$, a thickness of the liquid crystal layer is d, and a pretilt angle of the liquid crystals is $\theta$;
a first biaxial compensation film and a second biaxial compensation film respectively arranged on two sides of the liquid crystal panel, when the wavelength of the incident lights is 550 nm, an in-plain retardation value of the first biaxial compensation film is Ro1, a thickness retardation value of the first biaxial compensation film is Rth1, an in-plain retardation value of the second biaxial compensation film is Ro2, and a thickness retardation value of the second biaxial compensation film is Rth2, wherein:

$$342.8 \text{ nm} \leq \Delta n \times d \leq 361.4 \text{ nm};$$

$$85° \leq \theta < 90°;$$

$$35 \text{ nm} \leq Ro1 \leq 87.5 \text{ nm};$$

$$80 \text{ nm} \leq Rth1 \leq 200 \text{ nm};$$

$$28 \text{ nm} \leq Ro2 \leq 89.6 \text{ nm};$$

$$Y1 \leq Rth2 \leq Y2;$$

$$Y1=0.005389 \times Rth1^2-2.367048 \times Rth1+323.45;$$

$$Y2=-0.003571 \times Rth1^2+0.085714 \times Rth1+226.74.$$

5. The liquid crystal device as claimed in claim 4, wherein:

$$118.2 \text{ nm} \leq Rth1=Rth2 \leq 154.2 \text{ nm}.$$

6. The liquid crystal device as claimed in claim 4, wherein the liquid crystal display further comprises a first polarizing film and a second polarizing film arranged on two sides of the liquid crystal panel, the first polarizing film is arranged on the same side with the first biaxial compensation film, an absorbing axis of the first polarizing film and a slow axis of the first biaxial compensation film form an angle of 90 degrees, the second polarizing film is arranged on the same side with the second biaxial compensation film, and the absorbing axis of the second polarizing film and the slow axis of the second biaxial compensation film form an angle of 90 degrees.

7. The liquid crystal device as claimed in claim 6, wherein the first polarizing film and the second polarizing film are PVA films.

8. The liquid crystal device as claimed in claim 6, wherein the first biaxial compensation film is arranged between the first polarizing film and the liquid crystal panel, and the second biaxial compensation film is arranged between the second polarizing film and the liquid crystal panel.

9. The liquid crystal device as claimed in claim 8, wherein the liquid crystal display further comprises a first pressure sensitive adhesive layer and a second pressure sensitive adhesive layer, the first pressure sensitive adhesive layer is arranged between the first biaxial compensation film and the liquid crystal panel, and the second pressure sensitive adhesive layer is arranged between the second biaxial compensation film and the liquid crystal panel.

10. The liquid crystal device as claimed in claim 9, wherein the liquid crystal display further comprises a first TAC film and a second TAC film, the first TAC film is arranged on a first surface of the first polarizing film, the first surface faces away from the first biaxial compensation film, the second TAC film is arranged on a second surface of the second polarizing film, and the second surface faces away from the second biaxial compensation film.

11. A liquid crystal display, comprising:
a liquid crystal panel comprising a liquid crystal layer, the liquid crystal layer comprising a plurality of liquid crystals, when a wavelength of incident lights is 550 nm, a refractive index anisotropy of the incident lights is Δn, a thickness of the liquid crystal layer is d, and a pretilt angle of the liquid crystals is θ;
a first polarizing film and a second polarizing film arranged on two sides of the liquid crystal panel;
a first biaxial compensation film and a second biaxial compensation film respectively arranged on two sides of the liquid crystal panel, the first biaxial compensation film is arranged between the first polarizing film and the liquid crystal panel, the second biaxial compensation film is arranged between the second polarizing film and the liquid crystal panel, when the wavelength of the incident lights is 550 nm, an in-plain retardation value of the first biaxial compensation film is Ro1, a thickness retardation value of the first biaxial compensation film is Rth1, an in-plain retardation value of the second biaxial compensation film is Ro2, and a thickness retardation value of the second biaxial compensation film is Rth2, wherein:

342.8 nm ⩽ Δn×d ⩽ 361.4 nm;

85° ⩽ θ<90°;

35 nm ⩽ Ro1 ⩽ 87.5 nm;

80 nm ⩽ Rth1 ⩽ 200 nm;

28 nm ⩽ Ro2 ⩽ 89.6 nm;

Y1 ⩽ Rth2 ⩽ Y2;

Y1=0.005389×Rth1$^2$−2 367048×Rth1+323.45;

Y2=−0.003571×Rth1$^2$+0.085714×Rth1+226.74;

the first polarizing film is arranged on the same side with the first biaxial compensation film, an absorbing axis of the first polarizing film and a slow axis of the first biaxial compensation film form an angle of 90 degrees, the second polarizing film is arranged on the same side with the second biaxial compensation film, and the absorbing axis of the second polarizing film and the slow axis of the second biaxial compensation film form an angle of 90 degrees, and wherein the first polarizing film and the second polarizing film are polyvinyl alcohol (PVA) film.

12. The liquid crystal display as claimed in claim 11, wherein:

118.2 nm ⩽ Rth1=Rth2 ⩽ 154.2 nm.

13. The liquid crystal display as claimed in claim 11, wherein the liquid crystal display further comprises a first pressure sensitive adhesive layer and a second pressure sensitive adhesive layer, the first pressure sensitive adhesive layer is arranged between the first biaxial compensation film and the liquid crystal panel, and the second pressure sensitive adhesive layer is arranged between the second biaxial compensation film and the liquid crystal panel.

14. The liquid crystal display as claimed in claim 13, wherein the liquid crystal display further comprises a first Triacetyl Cellulose (TAC) film and a second TAC film, the first TAC film is arranged on a first surface of the first polarizing film, the first surface faces away from the first biaxial compensation film, the second TAC film is arranged on a second surface of the second polarizing film, and the second surface faces away from the second biaxial compensation film.

* * * * *